United States Patent [19]

Adams et al.

[11] Patent Number: 4,803,945
[45] Date of Patent: Feb. 14, 1989

[54] FISHING BOAT BACK REST AND POST MOUNT

[76] Inventors: Theodore J. Adams, 4280 NW. 10th Ter., Ft. Lauderdale, Fla. 33309; Burton W. Crowell, 250 SW. 32 Ave., Deerfield Bch., Fla. 33443

[21] Appl. No.: 102,376

[22] Filed: Sep. 29, 1987

[51] Int. Cl.⁴ .............................................. B63B 17/00
[52] U.S. Cl. ..................... 114/363; 297/353; 297/349
[58] Field of Search .............. 297/4, 5, 195, 349, 297/353, 383, 423; 114/363, 255

[56] References Cited

U.S. PATENT DOCUMENTS

| | | | |
|---|---|---|---|
| 313,642 | 3/1985 | Baldwin | 297/352 |
| 2,754,891 | 7/1956 | Barron | 297/352 |
| 3,428,976 | 2/1969 | Robinson | 114/363 |
| 3,477,673 | 11/1969 | Bereday | 297/423 |
| 3,591,112 | 7/1971 | Garmhausen | 114/363 |
| 3,990,743 | 11/1976 | Nelson | 297/352 |
| 4,183,579 | 1/1980 | Rojas | 297/195 |
| 4,366,981 | 1/1983 | Ziegler et al. | 297/4 |
| 4,425,863 | 1/1984 | Cutler | 114/363 |
| 4,587,921 | 5/1986 | Currey | 114/363 |
| 4,589,366 | 5/1986 | Eiber | 114/363 |
| 4,632,410 | 12/1986 | Bainbridge | 280/32.5 |
| 4,641,882 | 2/1987 | Young | 297/183 |
| 4,653,808 | 3/1987 | Opsvik | 297/423 |

*Primary Examiner*—Sherman D. Basinger
*Assistant Examiner*—Edwin L. Swinehart
*Attorney, Agent, or Firm*—Fleit, Jacobson, Cohn & Price

[57] ABSTRACT

An upright standard including upper and lower ends is provided together with mounting structure for mounting the lower end of the standard to a central area of a large plan area, generally horizontal and upwardly facing support surface of a fishing boat. A horizontally elongated abutment member is mounted from the upper end of the standard at substantially adult waist height above the support surface and the abutment member defines an upright horizontally facing abutment surface spaced outward from the standard in the direction in which the abutment surface faces. The abutment member is mounted from the upper end of the standard for angular displacement relative thereto about an axis generally coinciding with the longitudinal center line of the standard and the abutment surface is longitudinally arcuate so as to be outwardly concave. In addition, the opposite ends of the abutment surface are horizontally rounded so as to be convexly curved.

5 Claims, 2 Drawing Sheets

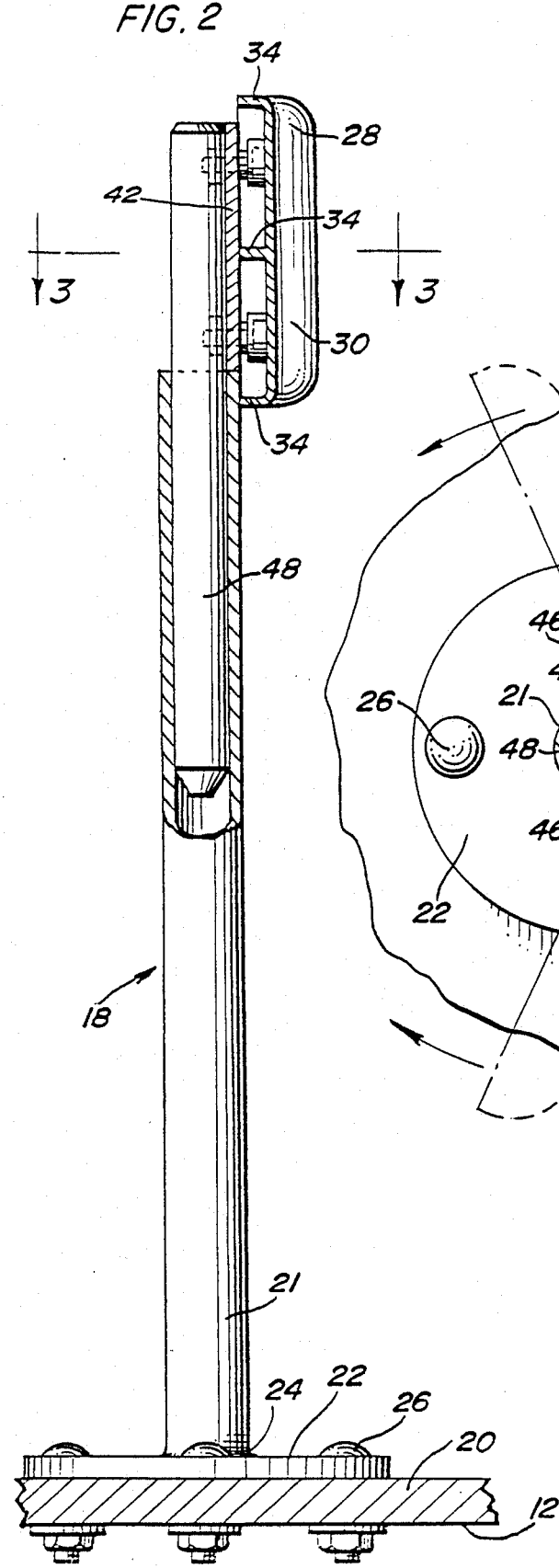
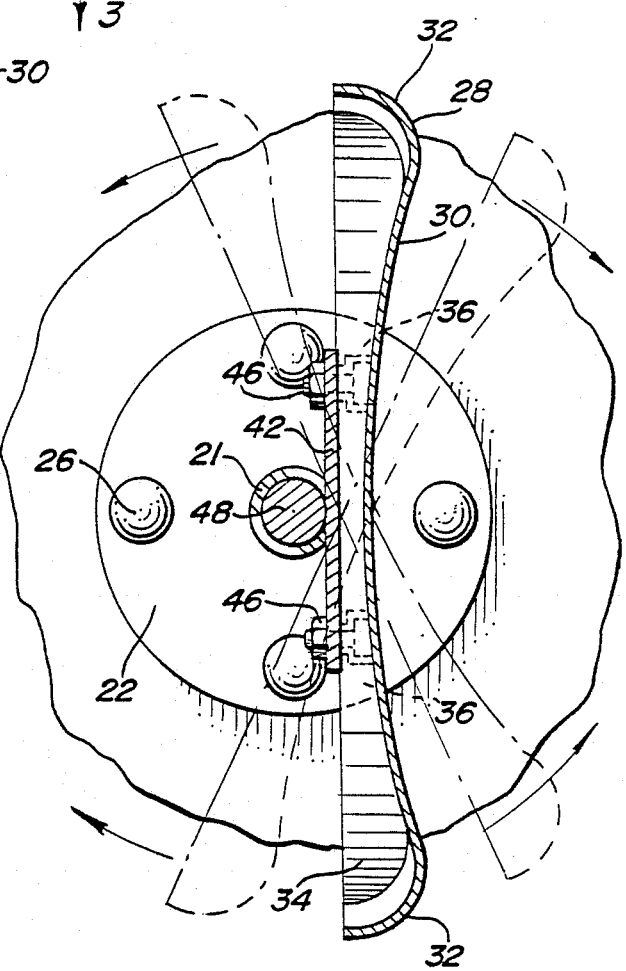

FISHING BOAT BACK REST AND POST MOUNT

BACKGROUND OF THE INVENTION

1. FIELD OF THE INVENTION

A generally waist high horizontally elongated and upright abutment member is provided including a horizontally facing upright abutment surface which is longitudinally concave. The abutment member is mounted from the upper end portion of a stationary standard for angular displacement thereabout and with the abutment surface spaced horizontally outward of the standard in the direction in which the abutment surface faces. The lower end of the standard is mounted from a central portion of a generally horizontal large plan area upwardly facing surface of a fishing boat upon which a fishing person may stand and the abutment surface may be engaged by the backside or rear waist area of the fishing person while the fishing person fishes in any selected direction from the associated boat.

2. DESCRIPTION OF RELATED ART

Various different forms of seat backs, seats and backrests for use while standing and which include some of the general structural and operational features of the instant invention are disclosed in U.S. Pat. Nos. 313,642, 2,754,891, 3,477,673, 3,990,743, 4,183,579, 4,632,410, 4,641,882 and 4,653,808. However, these previously known devices are not specifically designed to be used on a fishing boat and for a standing fishing person to lean his backside or lower rear waist portion against while fishing in any selected horizontal direction relative to the associated fishing boat.

SUMMARY OF THE INVENTION

The backrest of the instant invention incorporates an upright standard having upper and lower ends with the lower end of the standard stationarily mounted relative to a central area of a large plan area upwardly facing support surface of a fishing boat upon which a fishing person may stand. A horizontally elongated and upright abutment member is mounted from the upper end of the standard at generally waist height and defines a horizontally facing abutment surface spaced outward of the side of the standard from which the abutment member is supported and the abutment member is mounted from the upper end of the standard for angular displacement relative thereto about an axis generally coinciding with the longitudinal center line of the standard. Further, the horizontally elongated abutment surface is longitudinally concave and includes opposite ends which are convexly curved in the longitudinal direction.

Lightweight fishing boats often are allowed to drift in a slow current passed bank, stream and eddy areas believed to contain fish and during these periods of drifting the attendant fishing boat may turn as a result of being acted upon by different stream current areas and wind.

It is during these fishing operations that a fishing person usually desires to stand, inasmuch as a fishing person can more accurately cast to a selected fishing area if he or she is facing in the direction of that area. For this reason, fishing persons will assume a standing position rather than a seated position (even though the associated fishing boat may be provided with swivel seats). Standing while fishing in this manner can cause back muscle fatigue in a relatively short period of time, particularly if the water in which the associated boat is disposed is not absolutely calm and the fishing person must constantly use leg and back muscles to retain his or her balance.

Accordingly, the main object of this invention is to provide a backside or lower rear waist area support against which a fishing person may lean while standing and which is mounted above a generally horizontal large plan area upwardly facing support surface of a fishing boat from which a fishing person may stand and with the backrest being mounted for angular displacement about an upstanding axis.

Another object of this invention, in accordance with the immediately preceding object, is to provide a backrest which is contoured, intermediate its opposite ends, for close conformity to the contour of the area of a fishing person to be abutted thereagainst and which is further contoured, at horizontal opposite ends thereof, to enable the backrest to assume a corrective angularly displaced position in the event a fishing person attempts to lean thereagainst while the backrest is out of the precise desired angularly displaced position.

Still another important object of this invention is to provide a backrest which may be used in conjunction with substantially any type of fishing boat provided with a large plan area generally horizontal upwardly facing support surface for support of a fishing person in standing position thereon.

A further object of this invention is to provide a backrest in accordance with the preceding object and which includes a backrest member engageable by an associated fishing person removably supported from an upright standard for the backrest member.

A final object of this invention to be specifically enumerated herein is to provide a backrest in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an enlarged fragmentary vertical sectional view taken substantially upon the plan indicated by the section line 2—2 of FIG. 1;

FIG. 3 is a horizontal sectional view taken substantially upon the plane indicated by the section line 3—3 of FIG. 2 and with alternate rotated positions of the backrest member illustrated in phantom line.

DESCRIPTION OF THE PREFERRED EMBODIMENT

Figure 1:
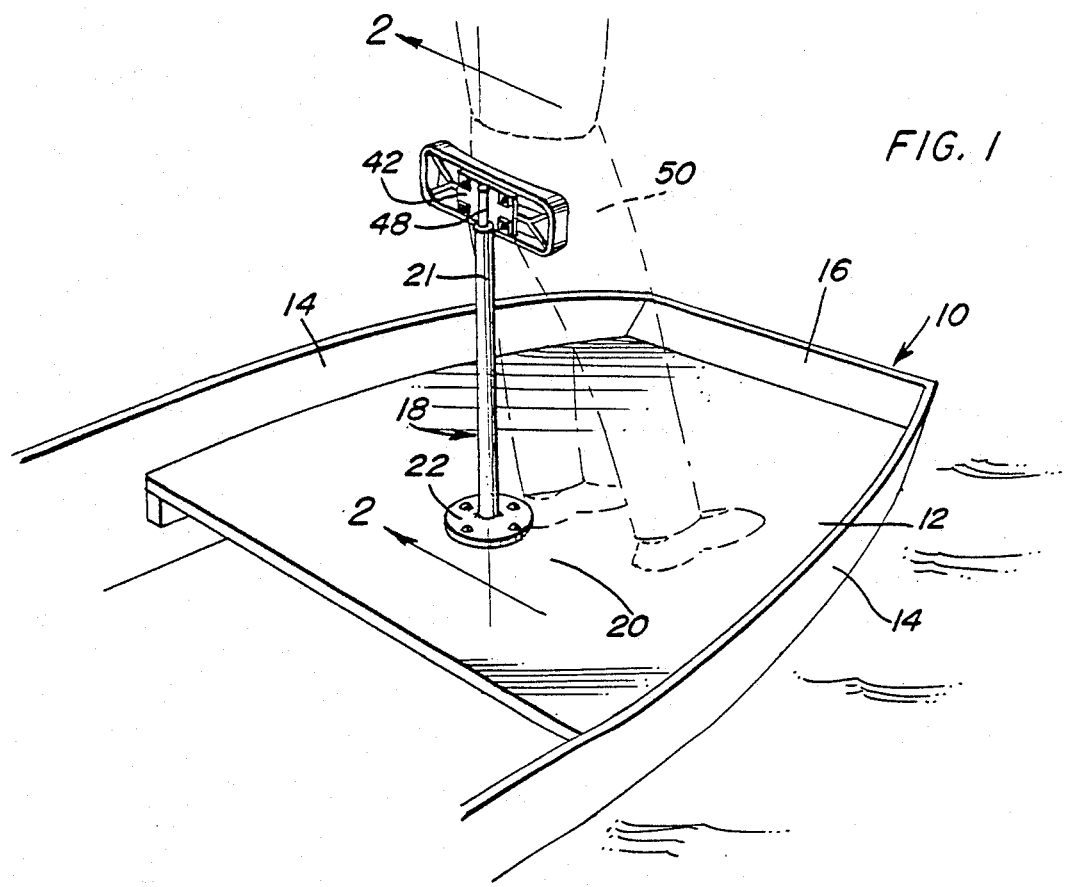
FIG. 1 is a fragmentary perspective view of the bow end of a conventional lightweight fishing boat and with the backrest of the instant invention operatively mounted on a central area portion of a large plan area upwardly facing support surface of the fishing boat upon which a fishing person may stand.
Figure 4:
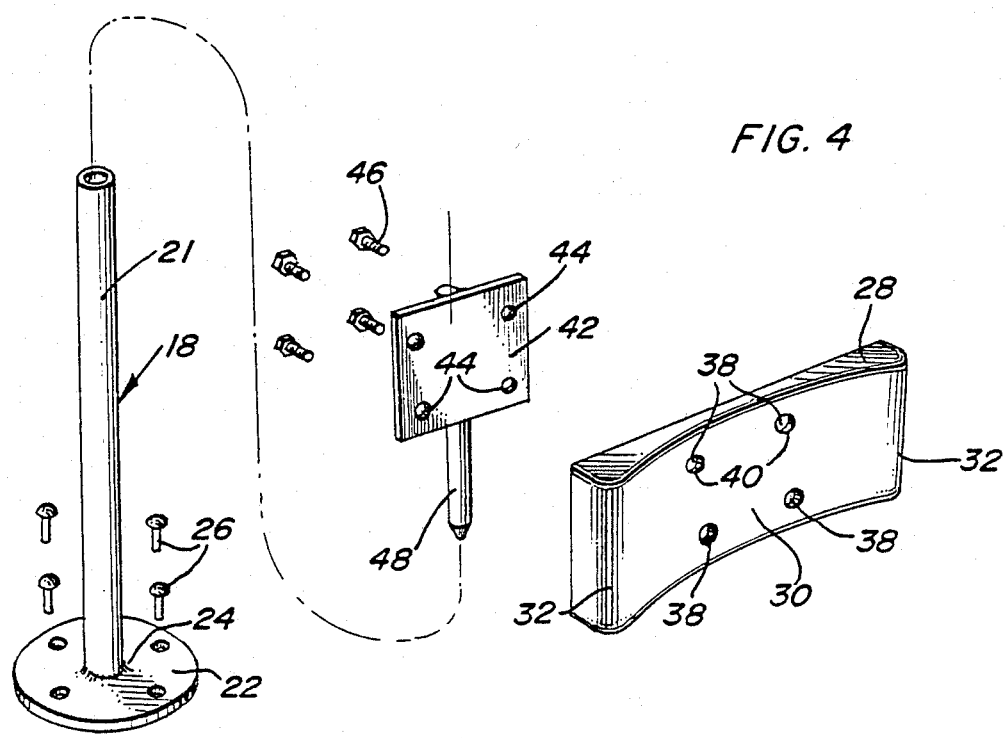
FIG. 4 is an exploded perspective view of the backrest.

Referring now more specifically to the drawings, the numeral 10 generally designates a lightweight fishing boat including a raised generally horizontal forward deck portion 12 disposed inwardly of the opposite side gunnel and bow portions 14 and 16 of the boat 10.

The deck portion 12 is substantially horizontal and planar and the backrest of the instant invention is referred to in general by the reference numeral 18 and mounted from a central area 20 of the deck portion 12.

The backrest 18 includes an upright tubular standard 21 upon whose lower end a horizontally enlarged mounting plate 22 is securely fastened by welding 24 and a plurality of through bolts 26 are secured through the mounting plate 22 and the central area 20 of the deck portion 12. In this manner, the standard 21 is securely mounted from the deck portion 12.

The backrest 18 additionally includes a waist/backside support in the form of an upright horizontally elongated abutment member 28 of appreciably greater horizontal length than height and defining an upright and horizontally elongated generally horizontally facing abutment surface 30 extending longitudinally of the abutment member 28. The surface 30 is longitudinally arcuate so as to be concave in the direction in which the surface 30 faces and the opposite ends of the surface 30 are longitudinally convexly curved as at 32. The abutment member may be constructed of molded plastic and includes horizontal reinforcing flanges 34 as well as integral bosses 36 through which horizontal bores 38 are formed, the ends of the bores 38 opening through the abutment surface 30 being provided with counter bores 40.

The abutment member 28 is secured to an edge upstanding, generally square mounting plate 42 having corner bores 44 formed therethrough with which the bores 38 may be registered and through the utilization of mounting bolts 46 secured through the bores 38 and 44. The mounting plate 42 is abutted against the surface of the abutment member 28 which faces in the direction opposite to the direction in which the abutment surface 30 faces and the side of the mounting plate 42 remote from the abutment member 28 has a depending cylindrical support shank 48 supported therefrom. The lower end of the shank 48 projects below the lower margin of the mounting plate 42 and is snugly, removably, telescopingly and rotatably received in the upper end of the tubular standard 21 with the lower marginal portion of the mounting plate 42 adjacent the shank 48 abutted against the upper end of the tubular standard 21. In this manner, the abutment member 28 is supported from the standard 21 in predetermined elevation relative thereto and with the abutment member 28 being feely angularly displaceable about the coinciding center axes of the standard 21 and the shank 48.

It will be noted that the surface 30 is closely spaced outward, in the direction in which the surface 30 faces, from the standard 21 and, accordingly, when a fishing person 50 (see FIG. 1) leans against the abutment member 28 with either his backside or the rear of his waist area, no portion of his body will contact the standard 21.

Of course, the abutment member 28 and shank 48 may be readily disengaged from the standard for proper storage during non-usage periods and it is to be further noted that the mounting plate 22 will be located relative to the central area 20 in a manner such that the fishing person 50 may have his feet engaged with the deck portion 12 adjacent the mounting plate 22 regardless of the side of the standard 21 upon which the fishing person 50 is disposed.

The height of the abutment member 28 above the deck portion 12 is arranged such that tall persons may abut their backsides against the abutment member 28 and shorter persons may abut their back portions or lower rear waist areas against the abutment member 28. Accordingly, one height of abutment member 28 will serve substantially all adults and, if desired, the standard 21 may be shortened in the event the abutment member 28 is to be used exclusively by children of less than usual adult height.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a boat of the type including a generally horizontal large plan area surface from which fishing operations may be carried out by a standing fishing person who may wish to stand in various positions on and spaced about a predetermined central area of said surface and face in horizontal directions extending outward from said central area of and positions on said surface, a backrest including an upright standard having upper and lower ends, means stationarily mounting the lower end of said standard from said central area of said surface, a waist, backside support comprising a horizontally elongated abutment member of appreciably greater horizontal length than height and having opposite ends and defining an upright generally horizontally outwardly facing longitudinal side abutment surface extending between said opposite ends of said abutment member, mounting means mounting said abutment member from the upper end of said standard with said abutment surface closely spaced horizontally outward from said standard in the direction in which said abutment surface faces and for angular displacement of said abutment member about an upright axis generally centered relative to said standard and spaced centrally intermediate said opposite ends, said abutment surface being longitudinally arcuate and outwardly concave, said abutment member and at least the upper half of said standard being free of structures supported therefrom and projecting in said direction past a vertical plane containing the opposite end portions of said abutment surface.

2. The boat and backrest combination of claim 1 wherein the opposite ends of said abutment surface are convexly rounded.

3. The boat and backrest combination of claim 1 wherein said mounting means includes a depending shank stationarily mounted relative to said abutment member and removably telescopingly and rotatably engaged with the upper end of said standard.

4. The boat and backrest combination of claim 3 wherein said standard includes a tubular upper end portion and said shank is downwardly telescopingly and rotatably received in said standard upper end portion.

5. The boat and backrest combination of claim 4 wherein the opposite ends of said abutment surface are convexly rounded.

* * * * *